United States Patent
Yoshida et al.

(10) Patent No.: US 6,178,839 B1
(45) Date of Patent: Jan. 30, 2001

(54) BALL SCREW WITH LUBRICATING GREASE AND SEAL MEMBER OF SOLID LUBRICATING COMPOSITION

(75) Inventors: Isamu Yoshida, Iwata; Masahiro Nobutomo, Fukuroi; Takayuki Owada, Shizuoka-ken, all of (JP)

(73) Assignee: NTN Corporation, Osaka-fu (JP)

( * ) Notice: Under 35 U.S.C. 154(b), the term of this patent shall be extended for 0 days.

(21) Appl. No.: 09/203,499

(22) Filed: Dec. 1, 1998

(30) Foreign Application Priority Data

Dec. 2, 1997 (JP) .......................................... 9-331994

(51) Int. Cl.[7] .................................................. F16H 25/24
(52) U.S. Cl. ...................... 74/459; 74/89.15; 74/424.8 R
(58) Field of Search ...................... 74/89, 89.15, 424.8 R, 74/424.8 NA, 459, 458; 277/354, 399, 343, 570, 578, 944, 945, 946

(56) References Cited

U.S. PATENT DOCUMENTS

| | | |
|---|---|---|
| 3,729,415 | 4/1973 | Davis et al. . |
| 5,178,029 * | 1/1993 | Klinkenberg ...................... 74/424.8 R |
| 5,555,771 * | 9/1996 | Kuroiwa et al. ......................... 74/459 |
| 5,722,294 * | 3/1998 | Kobayashi et al. .......... 74/424.8 NA |
| 5,749,266 * | 5/1998 | Tsukada ..................... 74/459 |
| 5,782,135 * | 7/1998 | Kondo et al. ............................ 74/459 |
| 5,809,838 * | 9/1998 | Miyaguchi et al. ..................... 74/459 |
| 5,832,776 * | 11/1998 | Kuo .......................................... 74/89 |
| 5,906,136 * | 5/1999 | Yabe et al. .............................. 74/459 |

FOREIGN PATENT DOCUMENTS

| | | |
|---|---|---|
| 47-3455 | 9/1965 | (JP) . |
| 63-23239 | 5/1988 | (JP) . |

* cited by examiner

Primary Examiner—David Fenstermacher
(74) Attorney, Agent, or Firm—Arent Fox Kintner Plotkin & Kahn, PLLC

(57) ABSTRACT

A plurality of balls 3 are disposed for rolling and circulation in a spiral calculation passage defined between a spiral screw groove surface 1a formed on the outer periphery of a screw shaft 1 and a spiral screw groove surface 2a formed on the inner periphery of a ball nut 2. The opposite ends of the ball nut are each formed with a seal mounting portion 2b, in which a seal member 4 made of solid lubricating composition is mounted, sealing off the ball nut 2. The ball nut 2 has lubricating grease G sealed therein.

1 Claim, 2 Drawing Sheets

BALL SCREW WITH LUBRICATING GREASE AND SEAL MEMBER OF SOLID LUBRICATING COMPOSITION

BACKGROUND OF THE INVENTION

The present invention relates to a ball screw used in an environment in which intrusion of foreign matter into the ball nut or the lubricant being washed away from the ball not is liable to cause an insufficiency of lubrication.

Many sealing devices for ball screws are of a type in which a non-contact seal made of rubber or the like is mounted on the end of the ball nut. In this case, however, since there is a clearance between the inner periphery of the seal member and the groove surface of the screw shaft, the effect of suppressing foreign matter intrusion and sealed grease wash-away is decreased depending on the service conditions, sometimes leading to a lowering in the functional capability or the life of the ball screw. Under severe lubricating conditions as in the case where the surrounding environmental temperature is high or the travel stroke or the travel speed of the ball nut (rpm of the screw shaft) is large, the use of the lubricating oil supplied by the sealed grease alone is likely to result in an insufficient amount of lubrication available in the areas of contact between the balls and the screw groove surface.

SUMMARY OF THE INVENTION

Accordingly, it is an object of the present invention to improve sealability and lubrication performance simultaneously, to thereby provide a ball screw which has a long life under severe conditions as described above.

According to the invention, to achieve the above object, lubricating grease is sealed in a ball nut and a seal member is made of a solid lubricating composition containing a lubricating oil as a component which is of the same kind as the base oil of the lubricating grease or which does not lower the lubricability by interaction therewith, the seal member being mounted on each end of the ball nut with its inner periphery placed in slide contact with the groove surface of the screw shaft. The "lubricating composition" is in solid form, retaining lubricating oil as a component in the structure of the base material such as synthetic resin, and has an oily surface in that the lubricating oil component retained in the base material gradually continuously seeps onto the surface thereof. The wording "containing lubricating oil as a component" refers to a manner in which it is dispersed and retained in the state of lubricating oil in the matrix of the base material and also a manner in which it is dispersed and retained in the state of lubricating grease in the matrix of the base material. As lubricating compositions, it is possible to use, for example, the compositions described in Japanese Patent Publication Kokoku Sho 63-23239 and Sho 47-3455.

A seal member made of such lubricating composition is placed in slide contact with the groove surface of the ball screw to seal off the ball nut, whereby a high degree of sealability is obtained and the lubricating oil component (the retained lubricating oil or the base oil of the retained lubricating grease) is gradually continuously fed from the lubricating composition to the portion in slide contact with the screw groove surface, reducing the friction force in said slide contact portion. Further, the lubricating oil component fed to said slide contact portion is fed to the portion in contact with the balls as the screw groove surface travels with the operation of the ball screw, thereby assisting the lubricating function of the lubricating grease (sealed grease) in the ball nut. That is, in the case where the amount of sealed grease in maintained at a suitable value necessary for lubrication of the interior of the ball nut, a satisfactory lubricating function provided by the sealed grease can be expected; however, the amount of sealed grease inevitably decreases with the passage of the operating time, even in which case, the amount by which the function is lowered by the decrease in the amount of sealed grease is compensated by the lubricating function of the lubricating oil component supplied from the lubricating composition, so that the lubricating function which is satisfactory on the whole is maintained for a long time.

As described above, since the lubricating oil component supplied from the lubricating composition assists the lubricating function of the sealed grease while reducing the friction force in the seal slide contact portion, it is desirable that the lubricating oil component of the lubricating composition and the base oil component of the sealed grease be of the same kind or be such that their interaction will not cause a lowering of lubricability. The wording "same kind" means that the lubricating oil component of the lubricating composition and the base oil component of the sealed grease are identical or similar. Further, the wording "interaction does not cause a lowering of lubricability" means that the lubricating oil component of the lubricating composition and the base oil component of the sealed grease do not undergo a physical or chemical interaction which leads to a lowering of lubricability. That is, as considered from the standpoint of lubricating function, the two components are compatible.

The present invention has the following effects.

(1) In the case where the amount of sealed grease is maintained at a proper value necessary for the lubrication of the interior of the ball nut, a satisfactory lubricating function by the sealed grease can be obtained. Further, even if the amount of sealed grease decreases with the passage of operating time, the lowering of the function attending the decrease in the amount of sealed grease is compensated by the lubricating function of the lubricating oil component fed from the seal member; thus, the lubricating function which is satisfactory on the whole is maintained for a long time. Therefore, the ball screw of the present invention has a high service life even under severe lubricating conditions.

(2) Since the inner periphery of the seal member formed of solid lubricating composition is in slide contact with the screw groove surface of the screw shaft, the lubricating grease sealed in the ball nut can hardly leak out and foreign matter can hardly intrude from outside.

(3) The lubricating oil component retained in the structure of the base material of the seal member gradually continuously seeps out to the portion which is in contact with the screw groove surface of the screw shaft, reducing the friction force in the slide contact portion, so that there is little wear of the seal member and the torque is low.

DESCRIPTION OF THE PREFERRED EMBODIMENTS

Embodiments of the invention will now be described.

Figure 1:
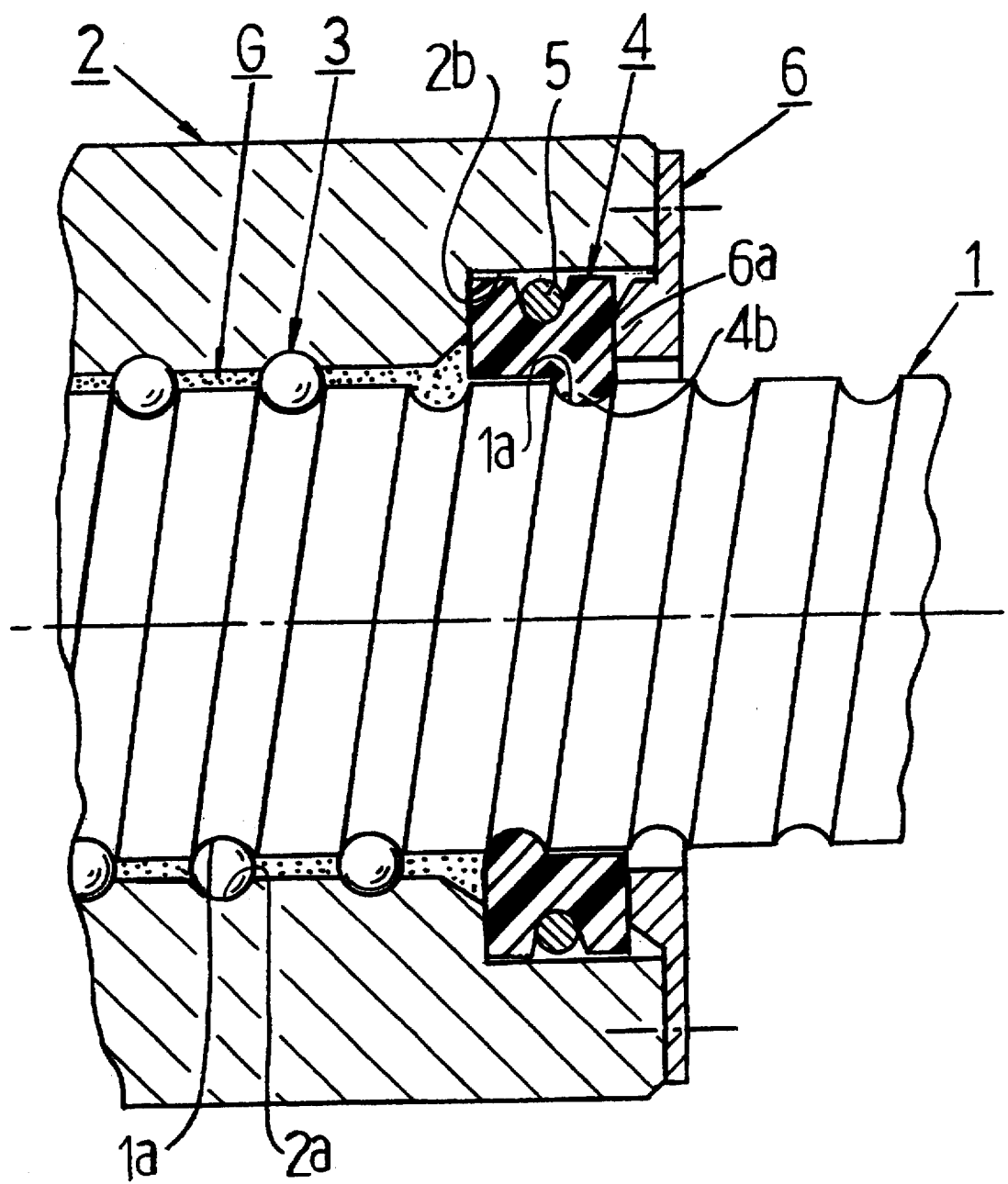
FIG. 1 is a sectional view showing an embodiment of the invention.

As shown in FIG. 1, a plurality of balls 3 are disposed for rolling and circulation in a spiral circulation passage defined between a spiral screw groove surface 1a formed on the outer periphery of a screw shaft 1 and a spiral screw groove surface 2a formed on the inner periphery of a ball nut 2. The opposite ends of the ball nut (only one of which is shown in FIG. 1) are each formed with a seal mounting portion 2b, in which a seal member 4 made of solid lubricating composition is mounted, sealing off the ball nut 2. The ball nut 2 has lubricating grease G sealed therein.

Figure 2:
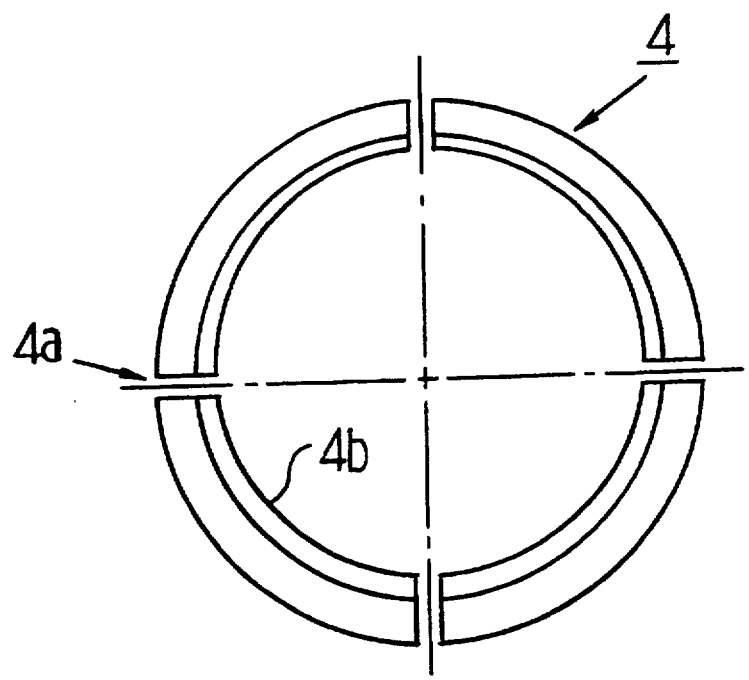
FIG. 2 is a front view of a seal member.

As shown in FIG. 2, the seal member 4 is in the form of, for example, a four-split ring which has four circumferentially equispaced slits 4a and whose inner periphery is formed with a slide contact portion 4b in the form of a ridge adapted to fit in and suitably contact the screw groove surface 1a of the screw shaft 1.

The solid lubricating composition which is the forming material for the seal member 4 preferably has the property of causing its retained lubricating oil component to continuously seep to the surface at a temperature which is at least equal to normal temperature (20° C.), and such lubricating composition can be produced, for example, by a method which comprises the steps of uniformly mixing a predetermined amount of lubricating grease or lubricating oil and a predetermined amount of super molecular weight olefin powder, pouring the mixture into a mold of predetermined shape, melting it at a temperature which is not less than the gelling point of the super molecular weight polyolefin powder and which, if a lubricating grease is employed, is not more than the dropping point of such lubricating grease, and cooling it at normal temperature for solidification. The super molecular weight polyolefin powder is a powder of polyethylene, polypropylene, polybutylene, polymethylpentene, polybudene or a copolymer thereof, or a mixture of these individual powders, the molecular weight of each powder being selected so that the average molecular weight measured by the viscosity method is $1\times10^6 - 5\times10^6$. The polyolefins whose average molecular weight is in such range are superior in rigidity and oil retainability to low molecular weight polyolefins and seldom becomes flowable even when heated to high temperature. The proportion of such super molecular weight polyolefin in the lubricating composition should be 95–1 wt %. In addition, this amount is dependent on the oil separation factor, oil retainability, and hardness required by the composition. The greater the amount of super molecular weight polyolefin, the greater the hardness of the gel after melting and solidification at predetermined temperatures.

Further, the lubricating grease to be incorporated is not particularly limited; as lubricating greases thickened by soap or non-soap there may be cited such greases as of the lithium soap-diester type, lithium soap-mineral oil type, sodium soap-mineral oil type, aluminum soap-mineral oil type, lithium-soap diester mineral oil type, non-soap-diester type, non-soap-mineral oil type, non-soap-polyolester type, and lithium soap-polyolester type. The lubricating oil to be incorporated is not particularly limited, either; as lubricating oils available there may be cited such lubricating oils as of the diester type, mineral oil type, diester mineral oil type, polyolester type, paraffin type hydrocarbon oil (e.g., poly α-olefin oil), naphthene type hydrocarbon oil, ether oil, and ester oil. In addition, it is desirable that the lubricating grease base oil or the lubricating oil, incorporated as the lubricating oil component, be the same as or similar in component to the base oil of the lubricating grease G to be sealed in the ball nut 2; however, they may be different from each other, so long as the lubricability is now lowered.

Although the melting points of the super molecular weight polyolefins mentioned above are not constant as they vary according to their average molecular weights, the melting point of one whose average molecular weight measured by the viscosity method is $2\times10^6$, for example, is 136° C. As for commercially available products having said average molecular weight, there are "MIPERON (registered treademark) XM-220" produced by Mitsui Petrochemical Industries, Ltd., etc.

Therefore, to disperse and retain a lubricating grease or lubricating oil in a base material of super molecular weight polyolefin, the materials described above are mixed together and then the mixture is heated to a temperature which is not less than the gelling point of the super molecular weight polyolefin and which, if a lubricating grease is used, is less than the dropping point of such lubricating grease; for example, it is heated to 150–200° C.

Figure 3:
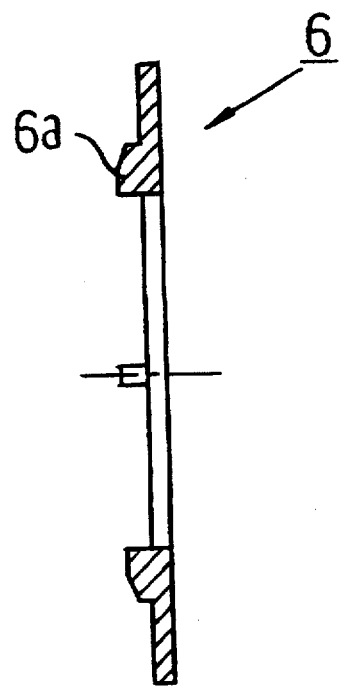
FIG. 3 is a sectional view of a seal presser.

The seal member 4 molded into a predetermined shape using said lubricating composition, as shown in FIG. 1, is mounted, with an elastic member, e.g., a garter spring 5 fitted thereon, in the seal mounting portion 2b of the ball nut 2, and fixed in position by a seal presser 6. The seal presser 6 is, e.g., in the form shown in FIG. 3, having four circumferentially equispaced pressing portions 6a corresponding to the divisional portions of the seal member 4, and is fixed in position on the end surface of the ball nut 2 by means such as screw fasteners.

The divisional portions of the seal member 4 are elastically urged radially inward by the garter spring 5 such that slide contact portions 4b on its inner periphery are fitted in the screw groove surface 1a of the screw shaft 1 and contact the screw groove surface 1a with an interference of not more than zero. The term "interference of not more than zero" means that the slide contact portions 4b contact the screw groove surface 1a without any interference or that the slide contact portions 4b contact the screw groove surface 1a with some interference.

When the screw shaft 1 (or ball nut 2) is rotated, the torque is transmitted to the ball nut 2 (or screw shaft 1) through the balls 3, so that the ball nut 2 (or screw shaft 1) is axially moved. In this case, since the slide contact portions 4b of the seal member 4 slidably contact the screw groove surface 1a of the screw shaft 1 with an interference of not more than zero, the lubricating grease G sealed in the ball nut 2 can hardly leak out and foreign matter can hardly intrude from outside. Further, the lubricating oil component retained in the structure of the base material of the seal member 4 gradually continuously seep into the portion in slide contact with the screw groove surface 1a, reducing the friction force in the slide contact portion, so that there is little wear of the seal member 4 and the torque is low. Further, the lubricating oil component seeping from the seal member 4 into the screw groove surface 1a is fed to the portion in contact with the balls 3 as the screw groove surface 1a travels with the operation of the ball screw, thus assisting the lubricating function of the lubricating grease G. Therefore, even in the case where the sealed amount of lubricating grease G decreases with the passage of operating time, the lowering of the function of the lubricating grease G attending the decrease in the sealed amount is compensated by the lubricating function of the lubricating oil component fed from the seal member 4; thus, even under severe lubricating conditions, the lubricating function which is satisfactory on the whole is maintained for a long time. Further, because of the arrangement in which the seal member 4 is mounted in the seal mounting portion 4b at the end of the ball nut 2, it is possible to obtain a ball screw according to this embodiment simply by replacing the seal member in the existing sealed ball screw.

In addition, the seal member 4 is not limited to the four-split ring shown in FIG. 2, and one-, two-, and threesplit rings may be employed. Further, an integral ring may be used so long as a sate of proper slide contact with the screw groove surface 1a of the screw shaft 1 can be obtained.

What is claimed is:

1. A ball screw comprising:

a screw shaft having a spiral screw groove surface formed on an outer periphery thereof;

a ball nut having a hole through which the screw shaft extends, an inner periphery of the hole being formed with a spiral screw groove surface;

a plurality of balls disposed in a spiral circulating passage defined between the screw groove surface of the screw shaft and the screw groove surface of the ball nut corresponding to each other; and an annular seal member mounted on each end of the ball nut, an inner periphery of the seal member being in sliding contact with the screw groove surface of the screw shaft.

wherein said ball nut is filled with lubricating grease, and the seal member is made of a solid lubricating composition containing a lubricating oil as a component wherein said lubricating oil in said solid lubricating composition is either of the same kind as a base oil of the lubricating grease or is compatible therewith, to compensate a lubricating function of said lubricating grease.

* * * * *